United States Patent
Tsai

(10) Patent No.: US 7,079,464 B2
(45) Date of Patent: Jul. 18, 2006

(54) FOCUSING METHOD OF LAYER JUMPING FOR AN OPTICAL STORAGE DEVICE

(75) Inventor: Chin-Yin Tsai, Junghe (TW)

(73) Assignee: Via Technologies, Inc., Taipei (TW)

( * ) Notice: Subject to any disclaimer, the term of this patent is extended or adjusted under 35 U.S.C. 154(b) by 432 days.

(21) Appl. No.: 10/156,187

(22) Filed: May 29, 2002

(65) Prior Publication Data

US 2003/0012109 A1    Jan. 16, 2003

(30) Foreign Application Priority Data

Jul. 11, 2001    (TW) .............................. 90117013 A

(51) Int. Cl.
*G11B 7/00*    (2006.01)
(52) U.S. Cl. ................. 369/53.28; 369/44.29
(58) Field of Classification Search ............. 369/53.28, 369/44.29, 44.27
See application file for complete search history.

(56) References Cited

U.S. PATENT DOCUMENTS

| | | | | |
|---|---|---|---|---|
| 5,754,507 A | * | 5/1998 | Nishikata ................. | 369/44.29 |
| 5,808,993 A | * | 9/1998 | Lee .......................... | 369/53.23 |
| 5,999,503 A | * | 12/1999 | Tateishi et al. .......... | 369/44.29 |
| 6,298,020 B1 | * | 10/2001 | Kumagami .............. | 369/44.27 |
| 6,330,212 B1 | * | 12/2001 | Iida ......................... | 369/30.16 |

FOREIGN PATENT DOCUMENTS

TW        281759        7/1996

* cited by examiner

*Primary Examiner*—Brian E. Miller
*Assistant Examiner*—Peter Vincent Agustin
(74) *Attorney, Agent, or Firm*—Rabin & Berdo, P.C.

(57) ABSTRACT

A focusing method of layer jump for an optical storage device to retrieve data from a multi-layer optical disc is disclosed. The optical disc includes first data layer and second data layer. Before layer jump, the focus is on the first data layer, and the second data layer is the target data layer to proceed with layer jump. If layer-jump failure, no matter where the focus is, an auxiliary force is provided to let the lens continuously move along the layer jump direction and prevent the focus from locating between the two data layers. And then, the lens moves along a backward direction to set on the second data layer according to a reference signal.

16 Claims, 5 Drawing Sheets

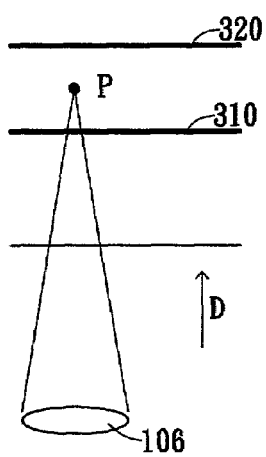
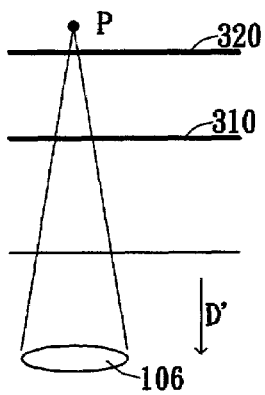
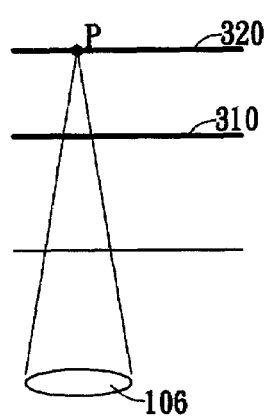
FIG. 4A  FIG. 4B  FIG. 4C
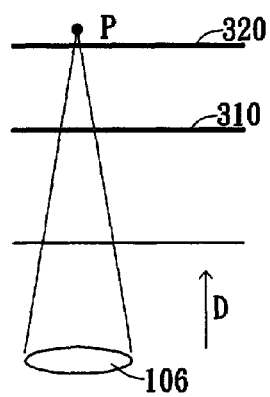
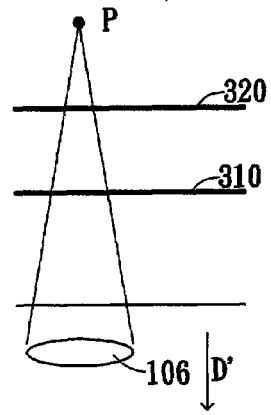
FIG. 4D  FIG. 4E

FOCUSING METHOD OF LAYER JUMPING FOR AN OPTICAL STORAGE DEVICE

This application incorporates by reference Taiwanese application Serial No. 09017013, filed Jul. 11, 2001.

BACKGROUND OF THE INVENTION

1. Field of the Invention

This invention relates to a focusing method, and more particularly, to a focusing method of layer jumping for an optical storage device to retrieve data from a multi-layer optical disc.

2. Description of Related Art

As the need of storage medium with high capacity greatly increases, optical storage devices now play an essential role. It has been a critical issue to reduce the data access time when reading data from the optical disc.

In a conventional optical storage drive, a disc is disposed on a spindle motor, which rotates the disc. The disc has multiple tracks for storing digital information, which is read by an optical pickup head. The optical pickup head is disposed on a sled. A sled driving motor can drive the sled, whereby the pickup head can reach the desired position for reading information of the disc.

The reading process of an optical drive includes the following steps. First, after the optical drive is initiated, the spindle motor is driven to rotate the optical disc. The optical pickup head is then moved to the inner ring of the optical disc, and the disc is rotated above the optical pickup head. Next, a focus servo of the optical drive is driven, and a laser beam is emitted and focused to form a laser spot on the optical disc. Then, a tracking servo of the optical drive is driven to move a lens of the optical pickup head, so as to enable the laser spot to trace the target data track. After that, a track number is read out to identify the present location of the optical pickup head. Next, a long seek operation is performed, that is, the seeking servo of the optical drive is activated to move the optical pickup head from the present track to the vicinity of the target track. Then, the tracking operation is performed and the optical pickup head reads its present track number for knowing the distance from the target track. Then, a short seek operation is performed, that is, the lens is moved with fine adjustment to move the laser spot to the target track. Then, the tracking operation is activated and data of the optical disc is read out.

FIG. 1 schematically illustrates the dual actuator system used in a seeking operation. As FIG. 1 shows, the dual actuator system is composed of a sled actuator 102 and a fine actuator 104. A lens 106 of the optical pickup head (not shown in the figure) is mounted on the fine actuator 104. During the seeking operation, the sled actuator 102 moves the fine actuator 104 back and forth on the actuator track 108, so as to let the lens 106 remain at a linear region of the fine actuator 104. A proper control on the sled actuator 102 and the fine actuator 104 is necessary to assure that the laser spot can be precisely focused onto the optical disc 114, which is affixed on the damper 110 and driven by the spindle motor 112. The sled actuator 102 usually is a sled motor, and the fine actuator 104 usually is a voice coil motor (VCM). The lens 106 is coupled to the sled through a spring coil of the VCM.

A focusing operation is employed for monitoring the distance between the optical disc 114 and the lens 106 in order to keep the focus point. Taking the astigmatism as an example, an optical pickup head includes a quartered beam sensor. The radiant in the quartered beam sensor will show a different shape when the laser beam is on a different location of optical disc. Now referring to FIG. 2A that illustrates the beam sensors in the optical pickup head, the quartered beam sensor consists of 4 beam sensors, 210, 220, 230, and 240, which are for sensing beam signals reflected from an optical disc. The intensity of the reflection received by the beam sensor 210 is defined as A. The intensity of the reflection received by the beam sensor 220 is defined as B. The intensity of the reflection received by the beam sensor 230 is defined as C. The intensity of the reflection received by the beam sensor 240 is defined as D. "Focus Error" (FE) signal is defined as FE=(B+D)−(A+C). In the case of correct focusing, the 4 intensities of the reflections from the 4 beam sensors are the same. Therefore, the FE signal is 0. When the optical disc is too close to the lens, the signals A and C, are stronger, and the signals B and D are weaker. Therefore, the FE signal is positive. On the other hand, if the disc is too far from the lens, the FE signal is negative. Therefore, the focus operation can be performed according to the FE signal. Please refer to FIG. 2B, which illustrates the waveform of the FE signal. As the figure shows, when the focus point is approaching the optical disc, the FE signal is changed from plus to 0, and then to minus. It is like a sine wave signal. The area between the peak value and bottom value of the wave can be regarded as a linear area. Within the linear area, the intensity of the FE signal and the distance between the focus and the data layer (not illustrated) are linear. Therefore, the present focus point can be known from the intensity of the FE signal within the linear area. When the FE signal is 0, it means correct focusing is occurring. Therefore, when focusing, via the combination of acceleration and brake, it is impossible to get the correct focus point by one focus operation. So focus compensation is needed. But the prerequisite for focusing compensation is that the present focus is within the linear area (because the location of focus is linear to the FE signal at this time.). If the focus is not within linear area, it is impossible to have successful focusing even by the focus compensation.

At this moment, there are many formats in the Digital Versatile Disc (DVD), such as single side single layer, single side double layer, double side single layer, and double side double layer. Therefore, a layer-jump (layer jumping) mechanism is needed when data is read from a multiple-layer optical disc. Next, reference is made to FIG. 3A, which illustrates the focus operation in a multiple-layer DVD. Taking this figure as an example, an optical disc 114 is a DVD, which includes multiple data layers (a data layer 310, and a data layer 320). And as shown in FIG. 3A, a lens 106 is focused on the data layer 310. Because the focus of the lens 106 is constant, when the optical drive tries to read data from the data layer 320, the lens 106 will be moved forward to let the focus set on the data layer 320 in order to retrieve data of the data layer 320. At this moment, the lens is closer to DVD 114, as FIG. 3B shows. In the same way, when the optical drive needs to read data of the data layer 310, another layer-jump procedure is needed to let the focus set on the data layer 310.

In layer jumping, the correctness of the focus operation depends on the value of the FE signal. Please refer to FIG. 3C, which shows an error on focusing. Take this figure as an example. Suppose when a layer jumping is performed, there is a noise and therefore the lens is not set on the linear area. Even by focus compensation, the lens cannot focus on the data layer 320. The focus between the data layer 310 and data layer 320 means a focusing failure. Another error that can happen is that during layer jumping, due to the influence of noise, the lens may be too close to the optical disc. It makes the focus over the data layer 320, which causes another focusing failure as FIG. 3D shows. The important thing is that irrespective of whether the noise makes the focus point between two data layers, or over the data layer 320 (as showed in FIG. 3D) or under the data layer 310, the FE signal is 0. Because of such a layer jump failure, the location of the lens cannot be known. Focusing must be performed again, which means spending more time and reducing the rate of data retrieving.

SUMMARY OF THE INVENTION

It is therefore an objective of the present invention to provide a focusing method when a layer jumping is performed to access data in an optical storage device. When there is a layer-jump failure, the invention helps to refocus quickly and continue to retrieve data.

In accordance with the foregoing objective and other objectives of the present invention, the invention provides a focusing method when a layer jumping is performed to access data from a multi-layer disc in an optical storage device. The processing steps are described as following.

The optical disc at least includes a first data layer and a second data layer. Before a layer jump, the focus is on the first data layer, and the second layer is the target data layer for the next layer jump procedure. When a layer jump fails, no matter where the focus is set, an auxiliary force is provided to let the lens continue to move along the layer jump direction and prevent the focus from locating between two data layers. The lens moves along the backward direction and focuses on the second data layer by the reference signal, wherein the backward direction is opposite to the layer jump direction. And the reference signal can be FE signal or another like signals.

BRIEF DESCRIPTION OF DRAWINGS

Objects, features, and advantages of the invention will become apparent from the following detailed description of the preferred but non-limiting embodiments. The description is made with reference to the accompanying drawings, in which:

FIGS. 4A~4E illustrates a focusing method according to the preferred embodiment of the invention.

DETAILED DESCRIPTION OF PREFERRED EMBODIMENTS

In order to have quick refocusing after a layer jump failure, the method of this invention uses an auxiliary force to continuously move the lens along the layer-jump direction. It makes the focus exceed the target data layer. And then, it enables quick refocusing again, because the location of the lens is roughly known. Please refer to FIG. 4A~4E, which illustrate a focusing method according to a preferred embodiment of this invention. The focus of the lens is supposed to move from the data layer 310 to the data layer 320. At this time, the data layer 320 is defined as the target data layer. The optical disc 114 can be a multiple layer Digital Versatile Disc (DVD). In layer jumping, the lens 106 will move along the layer-jump direction D, in order to let the focus P can set on the data layer 320. If noise makes the focus P unexpectedly locate between 2 data layers, according to the invention, an auxiliary force is provided to let the lens 106 continuously move along the layer-jump direction D. It makes the focus P exceeds the data layer 320, as FIG. 4B shows. Then, an added external force is applied to the lens 106 to let the lens 106 move along the backward direction D' until the focus P sets on the data layer 320. The backward direction D' is opposite to the layer-jump direction D. When the focus P moves along the backward direction D', the location of the focus P is known according to the FE signal. In the linear area of the FE signal, the intensity of the FE signal is linear to the distance from the focus to the data layer. Therefore, when the lens is moving back, the focus is set on the data layer 320 exactly (as shown in FIG. 4C), with FE=0. It is possible that the focus P sets above the data layer 320 due to noise, as FIG. 4D shows. According to the above-mentioned method, by the auxiliary force, the lens 106 continuously moves along the layer-jump direction to let the focus P move far away from the data layer 320 (as FIG. 4E shows). Then, the lens moves along the backward direction D' until the focus sets on the data layer 320 to finish the focusing procedure.

No matter where the focus is located in a focusing failure, via the auxiliary force, the location of the focus is guaranteed to exceed the target data layer. And then, when the lens is pulled to move back with the assistance of the reference signal (such as the FE signal), the focus can be set on the data layer exactly to complete the focusing procedure. On the other hand, the auxiliary force on the lens after a focusing failure can be realized by triangle waves or saw waves. It is not difficult to implement.

Figure 1:
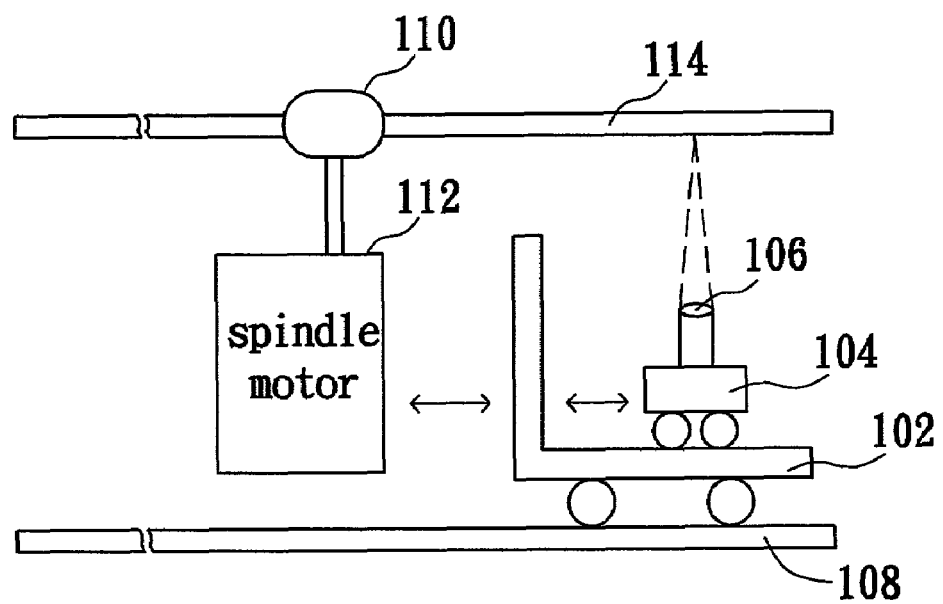
FIG. 1 illustrates the dual actuator system used in a seeking operation.
Figure 2A:
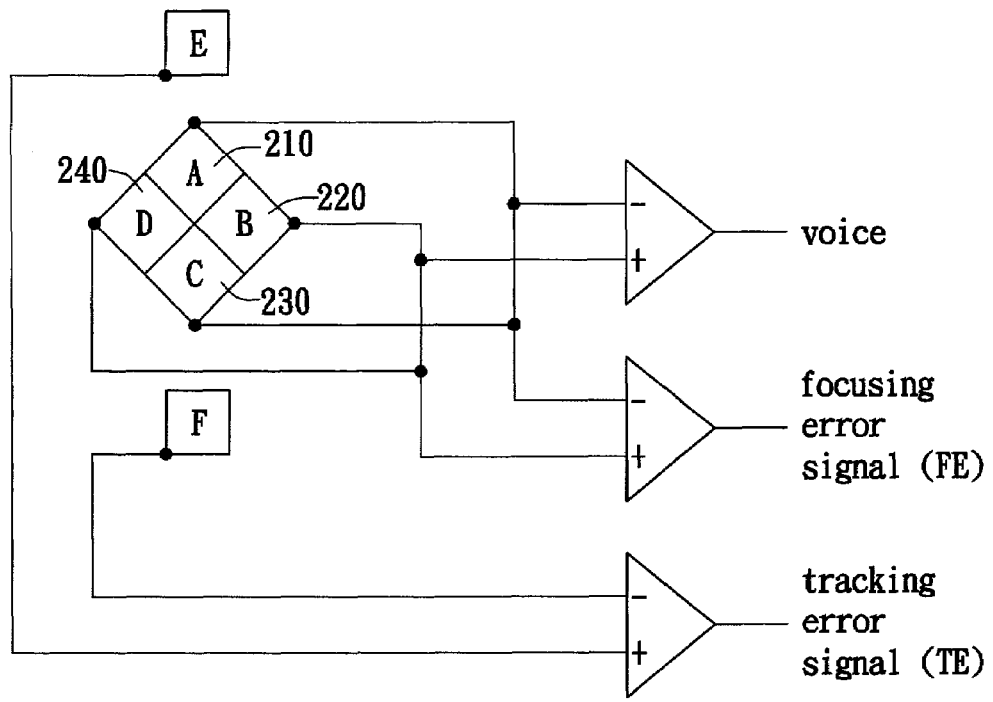
FIG. 2A illustrates the beam sensors of an optical pickup head.
Figure 2B:
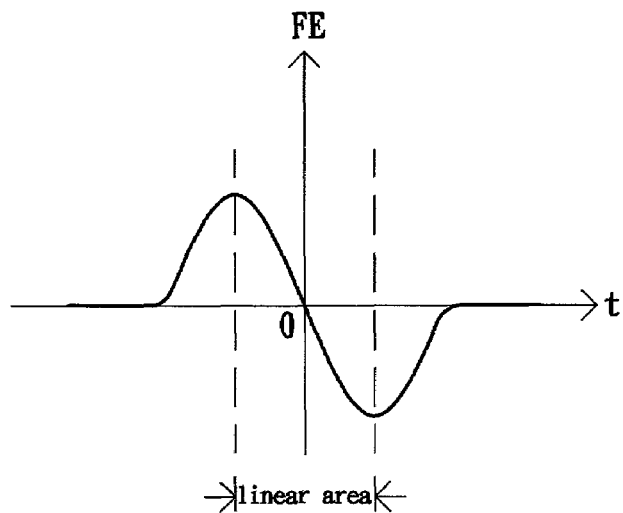
FIG. 2B illustrates a waveform of FE signal.
Figure 3A:
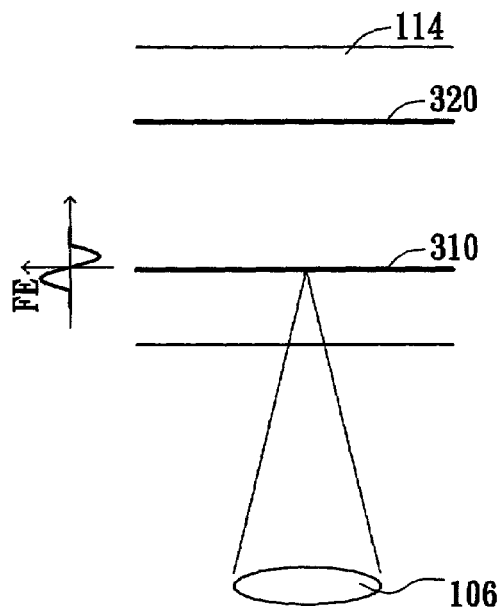
FIGS. 3A~3D illustrates data access from multi-layer disk.
Figure 3B:
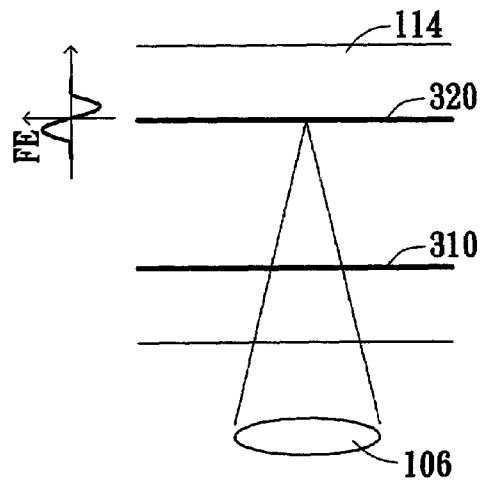
Figure 3C:
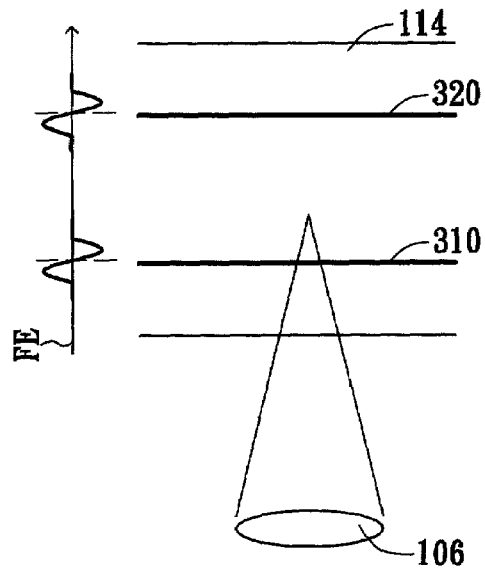
Figure 3D:
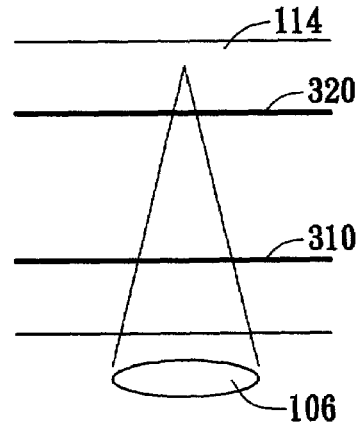
Figure 5A:
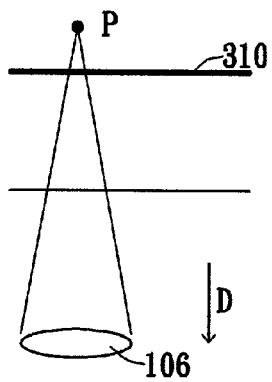
FIGS. 5A~5E illustrates another focusing method according to the preferred embodiment of the invention.
Figure 5B:
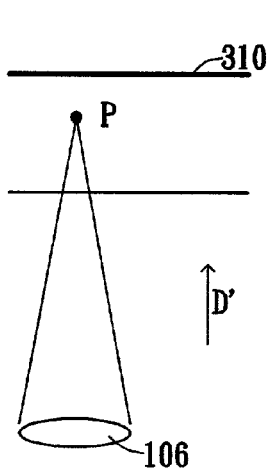
Figure 5C:
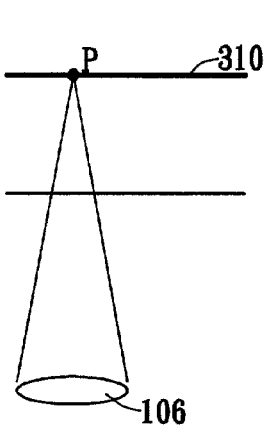
Figure 5D:
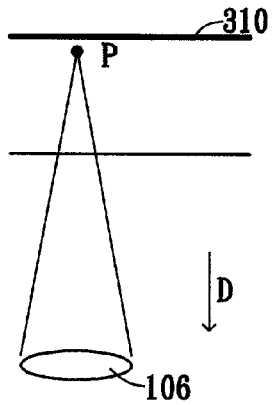
Figure 5E:
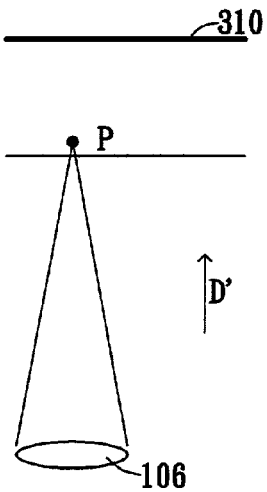

Next, please refer to FIG. 5A~5E, which illustrates another focusing method according to the preferred embodiment of the invention. The focus of the lens is supposed to be moved from the data layer 320 to the data layer 310. At this moment, the data layer 310 is the target data layer. In layer jumping, noise may make the focus P to stop between 2 data layers with a focusing failure, as FIG. 5A shows. In the invention, an auxiliary force causes the lens 106 to continuously move along the layer-jump direction D, and make the focus P below the data layer 310, as FIG. 5B shows. Then, the lens 106 is forced to move along the backward direction D' until the focus P sets on the data layer 310, as FIG. 5C shows. As known, in a layer jump, noise may make the focus under the data layer 310, as FIG. 5D shows. But according to the above-mentioned method, the auxiliary force can move the lens 106 along the layer-jump direction D to make the focus P move far away from the data layer 310. Then, another layer jumping operation can quickly make the focus set on the data layer 310.

In summary, the invention provides a focusing method of layer jumping for an optical storage device to access data. No matter where the focus is in a layer jump failure, a quick refocusing operation is performed again to facilitate data retrieving to avoid halting the optical storage device. The invention is suitable for a multi-layer optical storage device, for example, DVD-ROM drive, and the like.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A focusing method for use in an optical storage device, for moving a focus from a first data layer to a second data layer of a multiple-layer optical disc, wherein a reference signal linearly determines the position of the focus when the focus moves within a linear region with respect to a corresponding data layer of the multiple-layer optical disc, the focusing method comprising the steps of:
   if the focus, after a focus compensation, cannot be set on the second data layer and stops at an unknown position outside any linear region with respect to any data layer of the multiple-layer optical disc, providing an auxiliary force to let the focus move in a layer-jump direction and essentially exceed the second data layer, the layer-jump direction being from the first data layer to the second data layer; and
   after the focus exceeds the second data layer, providing an external force making the focus essentially move, in a direction opposite to the layer-jump direction, toward the second data layer and letting the focus set on the second data layer according to the reference signal.

2. The focusing method according to claim 1, wherein the reference signal is a Focus Error (FE) signal.

3. The focusing method according to claim 1, wherein the auxiliary force is a triangle wave.

4. The focusing method according to claim 1, wherein the optical disc is a multi-layer Digital Versatile Disc (DVD), and the optical storage device is a DVD compatible device.

5. A focusing method for use in an optical storage device, for moving a focus from a first data layer of a multiple-layer optical disc to a second data layer of the multiple-layer optical disc, wherein a reference signal linearly determines the position of the focus when the focus moves within a linear region with respect to a corresponding data layer of the multiple-layer optical disc, the focusing method comprising the steps of:
   if the focus cannot be set on the second data layer and stops at an unknown position outside any linear region with respect to any of the data layers,
      providing an auxiliary force to let the focus move, in a layer-jump direction toward the second data layer, to one of upper and lower locations of a range within which the focus can be set, the layer-jump direction being from the first data layer to the second data layer; and
   after the focus exceeds the second layer, providing an external force enabling the focus to move, in a direction opposite to the layer-jump direction, from the one of upper and lower locations of the range toward the second data layer and to set on the second data layer according to the reference signal.

6. The focusing method according to claim 5, wherein the reference signal is a Focus Error (FE) signal.

7. The focusing method according to claim 5, wherein the auxiliary force is implemented by a triangle wave.

8. The focusing method according to claim 5, wherein the optical disc is a multi-layer Digital Versatile Disc (DVD).

9. A servo method for use in an optical storage system, for moving a focus from a first data layer of a multiple-layer optical disc to a second data layer of the multiple-layer optical disc, wherein a reference signal linearly determines the position of the focus when the focus moves within a linear region with respect to a corresponding data layer of the multiple-layer optical disc, the servo method comprising the steps of:
   if the focus cannot be set on the second data layer and stops at an unknown position outside any linear region with respect to any of the data layers,
      providing a first auxiliary force to move a pickup head of the optical storage system to one of upper and lower locations of a movement range within which the pickup head can be moved;
      after the focus exceeds the second layer, providing a second auxiliary force to move the pickup head of the optical storage system from the one of upper and lower locations of the movement range, toward the second data layer, wherein the direction of the second auxiliary force is opposite to that of the first auxiliary force; and
      enabling the focus to set on the second data layer according to the reference signal during the movement of the pickup head toward the second data layer by the second auxiliary force.

10. The servo method according to claim 9, wherein the reference signal is a Focus Error (FE) signal.

11. The servo method according to claim 9, wherein the first and second auxiliary forces are implemented by triangle waves.

12. The servo method according to claim 9, wherein the optical disc is a multi-layer Digital Versatile Disc (DVD).

13. A focusing method for use in an optical storage system when a layer-jump failure occurs, wherein the layer-jump failure occurs in layer-jumping in order for a focus to move from a first data layer of a multiple-layer optical disc to a second data layer of the multiple-layer optical disc, a reference signal linearly determines the position of the focus when the focus moves within a linear region with respect to a corresponding data layer of the multiple-layer optical disc, the layer-jump failure occurs so that the focus stops at an unknown position outside any linear region with respect to any of the data layers, the focusing method comprising the steps of:
   providing a first auxiliary force to move a pickup head of the optical storage system to a predetermined location in a range within which the pickup head can be moved;
   after the focus exceeds the second layer, providing a second auxiliary force to move the pickup head of the optical storage system from the predetermined location toward the second data layer, wherein the direction of the second auxiliary force is opposite to that of the first auxiliary force; and
   enabling the focus to set on the second data layer according to the reference signal during the movement of the pickup head toward the second data layer by the second auxiliary force.

14. The focusing method according to claim 13, wherein the reference signal is a Focus Error (FE) signal.

15. The focusing method according to claim 13, wherein the first and second auxiliary forces are implemented by triangle waves.

16. The focusing method according to claim 13, wherein the optical disc is a multi-layer Digital Versatile Disc (DVD).

* * * * *